(12) United States Patent
Kudo et al.

(10) Patent No.: US 10,877,989 B2
(45) Date of Patent: Dec. 29, 2020

(54) DATA CONVERSION SYSTEM AND METHOD OF CONVERTING DATA

(71) Applicant: Hitachi, Ltd., Tokyo (JP)

(72) Inventors: Fumiya Kudo, Tokyo (JP); Tomoaki Akitomi, Tokyo (JP); Susumu Serita, Tokyo (JP); Yu Kitano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 354 days.

(21) Appl. No.: 15/756,436

(22) PCT Filed: Mar. 17, 2016

(86) PCT No.: PCT/JP2016/058579
§ 371 (c)(1),
(2) Date: Feb. 28, 2018

(87) PCT Pub. No.: WO2017/158802
PCT Pub. Date: Sep. 21, 2017

(65) Prior Publication Data
US 2018/0253479 A1    Sep. 6, 2018

(51) Int. Cl.
| | | |
|---|---|---|
| G06F 7/00 | (2006.01) | |
| G06F 17/00 | (2019.01) | |
| G06F 16/25 | (2019.01) | |
| G06F 16/22 | (2019.01) | |
| G06F 16/28 | (2019.01) | |
| G06F 16/23 | (2019.01) | |

(52) U.S. Cl.
CPC ......... *G06F 16/258* (2019.01); *G06F 16/221* (2019.01); *G06F 16/2358* (2019.01); *G06F 16/254* (2019.01); *G06F 16/285* (2019.01)

(58) Field of Classification Search
CPC ......... G06F 17/30569; G06F 17/30563; G06F 17/30598; G06F 17/30315; G06F 17/30368
USPC ............................................. 707/756
See application file for complete search history.

(56) References Cited

U.S. PATENT DOCUMENTS

| | | | | |
|---|---|---|---|---|
| 7,756,676 | B1 * | 7/2010 | Shan ............. | G06F 16/24556 |
| | | | | 702/182 |
| 7,809,781 | B1 * | 10/2010 | Shan ............. | G06F 17/18 |
| | | | | 708/200 |
| 7,836,111 | B1 * | 11/2010 | Shan ............. | G06Q 40/04 |
| | | | | 708/200 |
| 2003/0212664 | A1 * | 11/2003 | Breining ......... | G06F 16/84 |

(Continued)

FOREIGN PATENT DOCUMENTS

JP    2013-206104 A    10/2013

OTHER PUBLICATIONS

International Search Report of PCT/JP2016/058579 dated Jun. 14, 2016.

*Primary Examiner* — Binh V Ho
(74) *Attorney, Agent, or Firm* — Mattingly & Malur, PC

(57) ABSTRACT

This data conversion system is characterized by including: a storage unit that stores a column including a plurality of data elements; a range specification module that specifies the range of each of the data elements of the column; an information amount evaluation module that calculates the information amount of the data element within the specified range of the column; and a change point detection module that detects a point at which a change in the information amount according to a change in the specified range satisfies a predetermined condition.

11 Claims, 16 Drawing Sheets

(56) References Cited

U.S. PATENT DOCUMENTS

| | | | |
|---|---|---|---|
| 2009/0063396 A1* | 3/2009 | Gangarapu | G06F 16/2228 |
| 2010/0293163 A1* | 11/2010 | McLachlan | G06N 5/04 |
| | | | 707/736 |
| 2013/0259445 A1 | 10/2013 | Suzuki | |
| 2014/0032501 A1* | 1/2014 | Dulaney | G06F 16/219 |
| | | | 707/661 |
| 2014/0188820 A1* | 7/2014 | Pederson | G06F 16/24553 |
| | | | 707/693 |
| 2016/0337366 A1* | 11/2016 | Wright | G06F 21/6209 |
| 2017/0060890 A1* | 3/2017 | Booman | G06F 16/211 |

\* cited by examiner

OUTPUT TABLE

| ARTICLE LOCATION ID (FIRST TO SECOND DIGITS) 202 | ARTICLE LOCATION ID (THIRD TO FIFTH DIGITS) 203 | ARTICLE LOCATION ID (SIXTH TO SEVENTH DIGITS) 204 | ARTICLE LOCATION ID (EIGHTH TO NINTH DIGITS) 205 | ARTICLE LOCATION ID (TENTH TO ELEVENTH DIGITS) 206 | ITEM 207 | QUANTITY 208 |
|---|---|---|---|---|---|---|
| 04 | A51 | 01 | 05 | 02 | BOOKS | 3 |
| 04 | A51 | 01 | 15 | 01 | STATIONERY | 2 |
| 04 | A53 | 02 | 25 | 12 | FOOD | 10 |
| 02 | A53 | 02 | 26 | 18 | FOOD | 7 |
| 02 | B53 | 03 | 26 | 22 | BOOKS | 13 |
| : | : | : | : | : | : | : |
| 01 | C53 | 03 | 00 | 00 | BOOKS | 1 |

| RESPONSIBLE EMPLOYEE ID (FIRST TO FOURTH DIGITS) 209 | RESPONSIBLE EMPLOYEE ID (FIFTH TO SIXTH DIGITS) 210 | RESPONSIBLE EMPLOYEE ID (SEVENTH TO ELEVENTH DIGITS) 211 | PROCESSING TIME (FIRST TO TENTH DIGITS) 212 | PROCESSING TIME (TWELFTH TO THIRTEENTH DIGITS) 213 | PROCESSING TIME (FIFTEENTH TO SIXTEENTH DIGITS) 214 |
|---|---|---|---|---|---|
| 2013 | 50 | 00004 | 2016/01/07 | 09 | 12 |
| 2001 | 50 | 00020 | 2016/01/07 | 09 | 12 |
| 1998 | 50 | 00020 | 2016/01/07 | 12 | 45 |
| 2012 | 51 | 00050 | 2016/01/08 | 12 | 50 |
| 2007 | 52 | 00035 | 2016/01/08 | 18 | 30 |
| : | : | : | : | : | : |
| 1997 | 51 | 00012 | 2016/01/31 | 14 | 31 |

*FIG.3*

OUTPUT TABLE (WITH NAME INPUT)

| FLOOR | AREA NAME | AISLE NUMBER | ROW NUMBER | SHELF NUMBER | ITEM | QUANTITY | ·· |
|---|---|---|---|---|---|---|---|
| 04 | A51 | 01 | 05 | 02 | BOOKS | 3 | ·· |
| 04 | A51 | 01 | 15 | 01 | STATIONERY | 2 | ·· |
| 04 | A53 | 02 | 25 | 12 | FOOD | 10 | ·· |
| 02 | A53 | 02 | 26 | 18 | FOOD | 7 | ·· |
| 02 | B53 | 03 | 26 | 22 | BOOKS | 13 | ·· |
| : | : | : | : | : | : | : | ·· |
| 01 | C53 | 03 | 00 | 00 | BOOKS | 1 | ·· |

301 302 303 304 305 306 307 308

| ·· | ENTRY YEAR | AFFILIATED DEPARTMENT ID | ALPHABETICAL-ORDER NUMBER | PROCESSING DATE | PROCESSING TIME (HOUR) | PROCESSING TIME (MINUTE) |
|---|---|---|---|---|---|---|
| ·· | 2013 | 50 | 00004 | 2016/01/07 | 09 | 12 |
| ·· | 2001 | 50 | 00020 | 2016/01/07 | 09 | 12 |
| ·· | 1998 | 50 | 00020 | 2016/01/07 | 12 | 45 |
| ·· | 2012 | 51 | 00050 | 2016/01/08 | 12 | 50 |
| ·· | 2007 | 52 | 00035 | 2016/01/08 | 18 | 30 |
| ·· | : | : | : | : | : | : |
| ·· | 1997 | 51 | 00012 | 2016/01/31 | 14 | 31 |

SPECIFIC EXAMPLE OF COLUMN SEPARATION AND NAMING
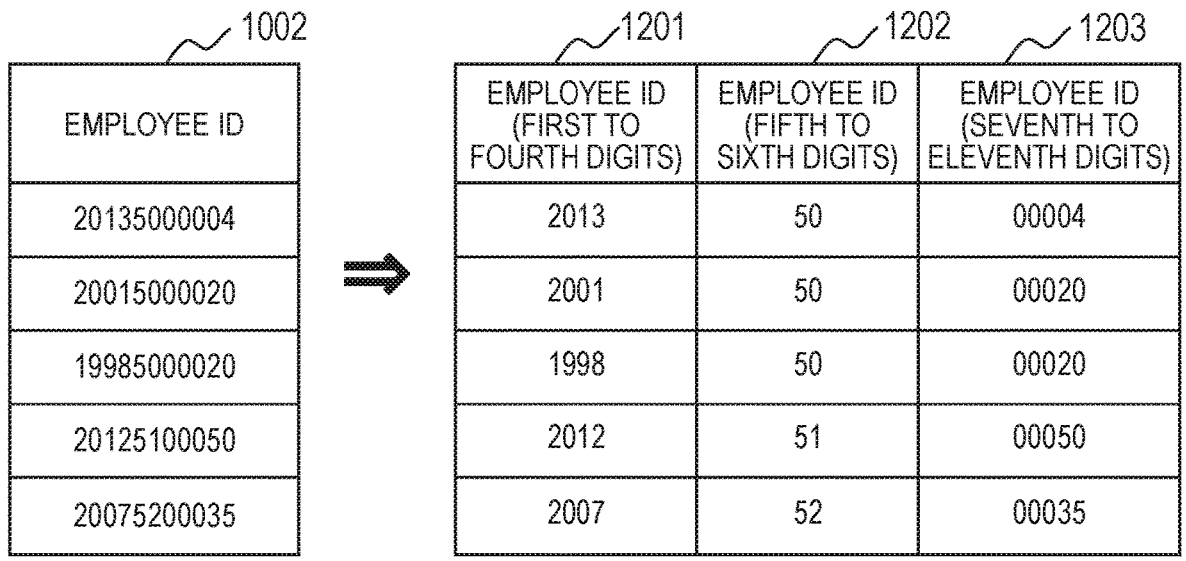
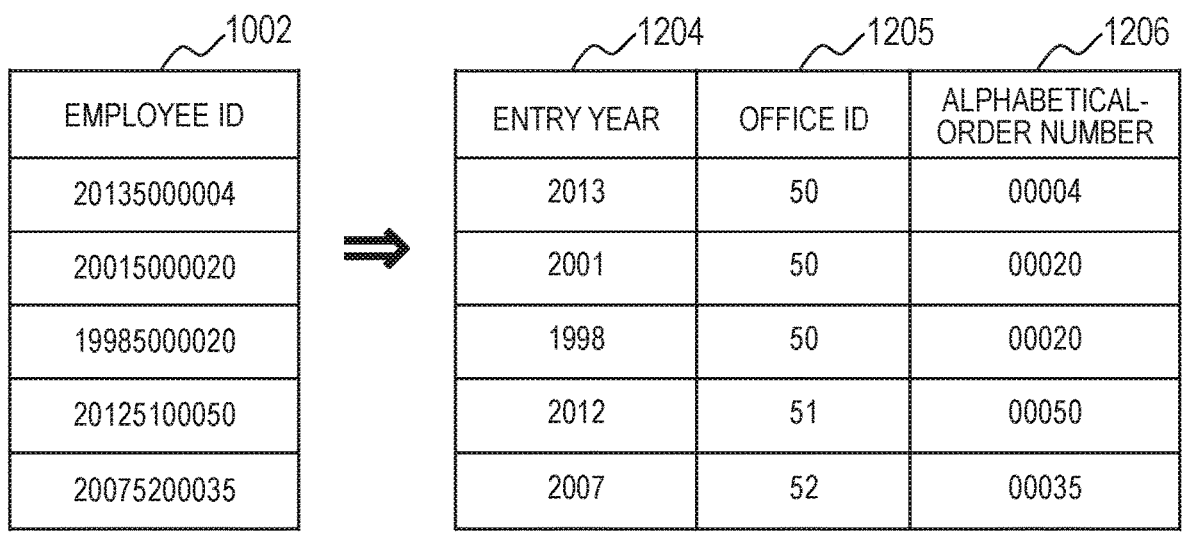
FIG.14

DATA CONVERSION SYSTEM AND METHOD OF CONVERTING DATA

BACKGROUND OF THE INVENTION

This invention relates to a technology for providing a system configured to automate data processing required for analysis based on statistical information obtained from each element in data.

In recent years, there have been actively developed systems configured to utilize big data relating to business performance accumulated by companies to analyze factors that lead to improvement of business performance. In general, an analyst examines large amounts of data including various types of information to determine what conditions may be factors that improve business performance. At this time, the analyst performs various kinds of data processing in order to extract items that may be related to business performance. However, when the size of the data increases, it becomes more difficult for the analyst to manually perform such data processing. Therefore, there is a need to develop a system for assisting data processing when large amounts of data are analyzed.

An example of a system for assisting data processing when large amounts of data are analyzed is a system described in JP 2013-206104 A. In JP 2013-206104 A, there is a description "a symbol string generation unit generates a symbol string in which symbols respectively representing attributes of a plurality of pieces of data are arranged in time-series order based on time-series data formed by the plurality of pieces of data arranged in time-series order, and a division unit divides the time-series data into a plurality of segments based on dispersion of each of the symbols in the symbol string."

SUMMARY OF THE INVENTION

Hitherto, there has been developed a system configured to automate the manual processing conducted by an analyst of data to be analyzed, in particular, extraction of higher-level-concept information, such as an attribute or an entry year, from label data, such as an ID or a name. As described above, in JP 2013-206104 A, there is proposed an apparatus configured to divide time-series data into a plurality of segments based on dispersion. However, in JP 2013-206104 A, the data to be handled is limited to time-series data. Moreover, the data is divided through use of dispersion, and hence the use of the disclosed apparatus is limited to numerical data presumed to be continuous.

To solve the foregoing problem, a representative example of this invention provides a data conversion system, comprising: a storage unit configured to store a column comprising a plurality of data elements; a range specification module configured to specify a range of each of the plurality of data elements in the column; an information amount evaluation module configured to calculate an information amount of each of the plurality of data elements having a specified range in the column; and a change point detection module configured to detect a point at which a change in the information amount in accordance with a change in the specified range satisfies a predetermined condition.

According to one embodiment of this invention, for example, a column in a higher-level-concept relation can be automatically extracted from each column in an input table to be analyzed. For example, for label data like an ID or a name, higher-level-concept data is extracted by focusing on each digit (character), and hence this invention can be applied to both numerical data and label data formed from a character string. The analysis speed and versatility are improved by using the extracted columns for the analysis. Problems, configurations, and effects other than those described above are made clear based on the following description of embodiments of this invention.

BRIEF DESCRIPTION OF THE DRAWINGS

FIG. 3 is an explanatory diagram of a first specific example of an output table stored in the data conversion system according to the first embodiment of this invention.

FIG. 4 is an explanatory diagram of a second specific example of the output table stored in the data conversion system according to the first embodiment of this invention.

FIG. 14 is an explanatory diagram of a specific example of the column separation processing module 406 in the first embodiment of this invention.

DETAILED DESCRIPTION OF THE PREFERRED EMBODIMENTS

First Embodiment

Now, description is made of an embodiment of this invention with reference to the accompanying drawings.

Figure 1:
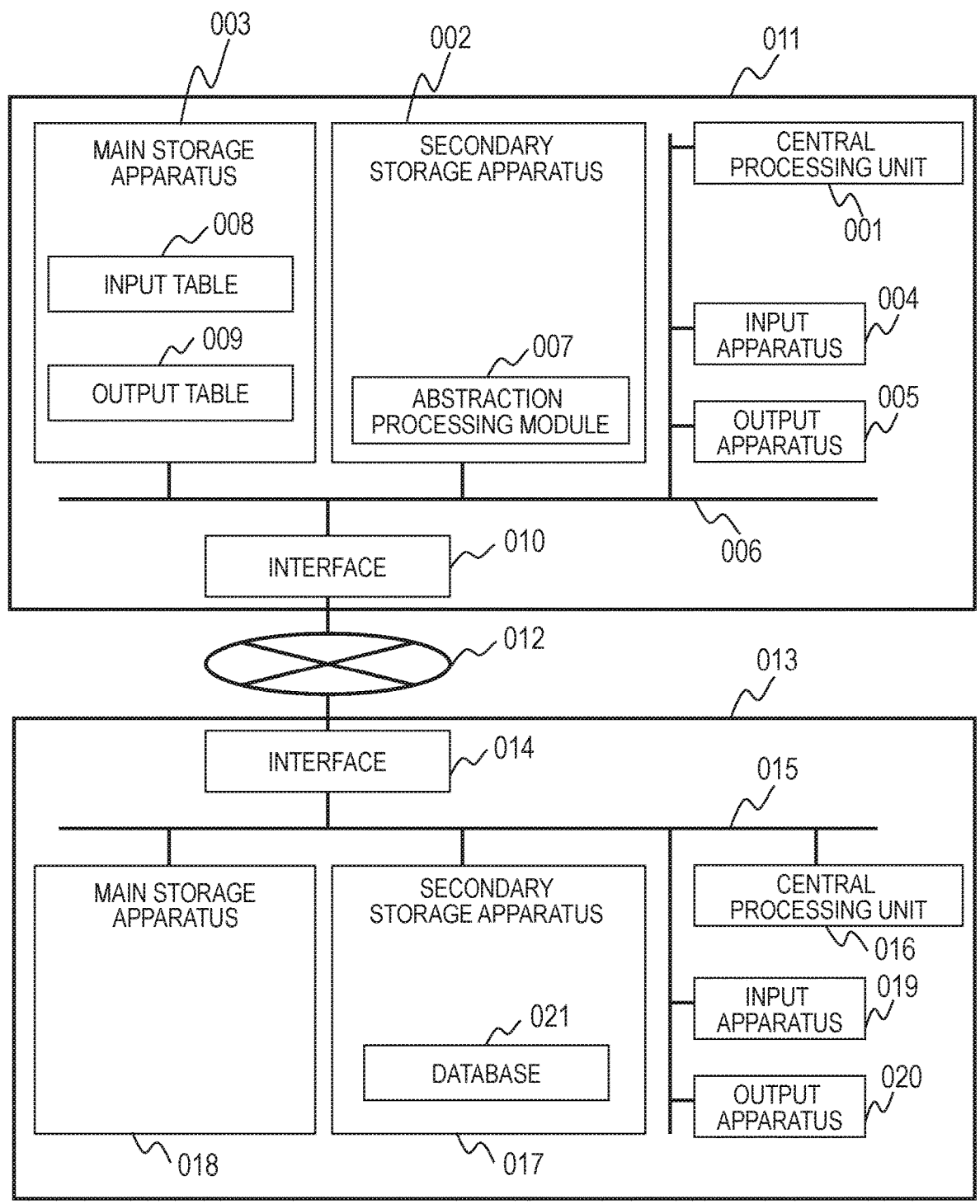
FIG. 1 is a block diagram for illustrating a hardware configuration of a data conversion system according to a first embodiment of this invention.

FIG. 1 is a block diagram for illustrating a hardware configuration of a data conversion system according to a first embodiment of this invention.

The data conversion system according to this embodiment is implemented by a computer 011 including a central processing unit 001, a secondary storage apparatus 002, a main storage apparatus 003, an input apparatus 004, and an output apparatus 005, in which the central processing unit 001, the secondary storage apparatus 002, the main storage apparatus 003, the input apparatus 004, and the output apparatus 005 are connected via a bus 006.

The central processing unit 001 is a processor configured to execute programs stored in the secondary storage apparatus 002 or the main storage apparatus 003.

The secondary storage apparatus 002 is a large-capacity and non-volatile storage apparatus, for example, a magnetic storage apparatus or a flash memory. The secondary storage apparatus 002 stores an abstraction processing module 007 to be calculated by the central processing unit 001 during program execution. The abstraction processing module 007 is an application program to be executed by the central processing unit 001. A part or all of the abstraction processing module 007 may be copied to the main storage apparatus 003 as required. The processing executed in the following description by the abstraction processing module 007 or processing modules included in the abstraction processing module 007 is actually executed by the central processing unit 001 in accordance with a program implementing the abstraction processing module 007 or a sub-program included therein.

The main storage apparatus 003 is a high-speed and volatile storage apparatus, for example, a dynamic random access memory (DRAM), and stores an operating system (OS) (not shown) and application programs. The central processing unit 001 executes the operating system to implement a fundamental function of the computer 011, and executes the application programs to implement functions provided by the computer 011. Specifically, the main storage apparatus 003 stores an input table 008 and an output table 009.

The input apparatus 004 is a user interface, for example, a keyboard or a mouse. The output apparatus 005 is a user interface, for example, a display apparatus or a printer.

The computer 011 may include a communication interface 010 coupled to a network 012 to control communication to/from another apparatus. In this case, the computer 011 is coupled to a terminal (not shown) via the communication interface 010, and the terminal includes the input apparatus 004 and the output apparatus 005 so that the terminal processes the table in response to a request from the terminal and outputs the processing result to the terminal.

The data conversion system according to this embodiment may further include a server computer 013 coupled to the network 012. A communication interface 014, a bus 015, a central processing unit 016, a secondary storage apparatus 017, a main storage apparatus 018, an input apparatus 019, and an output apparatus 020 of the server computer 013 may be the same as the respective parts having the same names of the computer 011, and hence description of those parts is omitted here. However, a database 021 is stored in the secondary storage apparatus 017 of the server computer 013. In this example, a part of a table included in the database 021 can be input to the computer 011 via the network 012 as the input table 008. The output table 009 may be output from the computer 011 to the server computer 013 via the network 012 and stored in the secondary storage apparatus 017 as a part of the database 021.

The data conversion system according to this embodiment may be built on one physical computer, or may be built on a logical partition configured on one or more physical computers. For example, the computer 011 and the server computer 013 may be built from a plurality of physical computers coupled to the network 012 as illustrated in FIG. 1, or may be built on one physical computer. The input table 008, the output table 009, and the abstraction processing module 007 stored in the computer 011 may be distributed and arranged in a plurality of physical computers coupled via the network 012, and the function of the abstraction processing module 007 may be implemented by exchanging data among those plurality of physical computers.

Next, the input table 008 to be input to the abstraction processing module 007 is described in detail. An analyst can perform various analyses on large-scale data by using the columns abstracted by this system.

Figure 2:
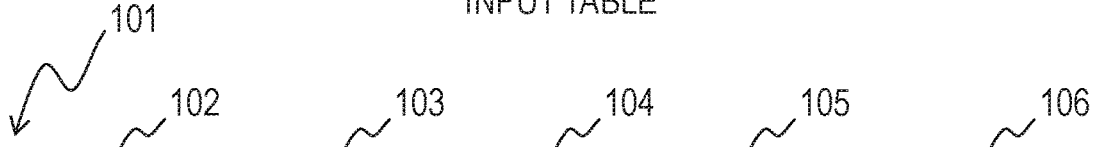
FIG. 2 is an explanatory diagram of a specific example of an input table stored in the data conversion system according to the first embodiment of this invention.

FIG. 2 is an explanatory diagram of a specific example of the input table 008 stored in the data conversion system according to the first embodiment of this invention.

Specifically, the table 101 shown in FIG. 2 is a specific example of the input table 008, which is stored in the main storage apparatus 003 illustrated in FIG. 1, and is input to the abstraction processing module 007.

The table 101 is a table for managing inventory articles held in a warehouse of a given company and data on the management situation of each article. In the table 101, there are stored an article location ID 102 column for uniquely defining the location of the held article, an item 103 column representing the type of article, a quantity 104 column representing the number of held articles, a responsible employee ID 105 column for identifying an employee who stored the article, and a processing time 106 column representing the date and time when the work is executed. Organizations such as companies generally manage the operational situation of the system and the inventory situation in a form like the table 101. In this embodiment, any table having a relational database format like the table 101 may be input. The output table 009 is obtained as a result of inputting the table 101 and executing the abstraction processing module 007.

FIG. 3 is an explanatory diagram of a first specific example of the output table 009 stored in the data conversion system according to the first embodiment of this invention.

The table 201 shown in FIG. 3 is a specific example of the output table 009 output by the abstraction processing module 007 to which the table 101 of FIG. 2 has been input. This output table 009 is stored in the main storage apparatus 003. The table 201 is a table having columns including higher-level-concept columns obtained based on abstraction of each of the columns of the table 101.

An article location ID (first to second digits) 202, an article location ID (third to fifth digits) 203, an article location ID (sixth to seventh digits) 204, an article location ID (eighth to ninth digits) 205, and an article location ID (tenth to eleventh digits) 206 in the table 201 are higher-level-concept columns extracted from the article location ID 102 column in the table 101. A responsible employee ID (first to fourth digits) 209, a responsible employee ID (fifth to sixth digits) 210, and a responsible employee ID (seventh to eleventh digits) 211 are higher-level-concept columns extracted from the responsible employee ID 105 column in the table 101. A processing time (first to tenth digits) 212, a processing time (twelfth to thirteenth digits) 213, and a processing time (fifteenth to sixteenth digits) 214 are higher-level-concept columns extracted from the processing time 106 column in the table 101. An item 207 and a quantity 208 are determined to be columns that do not have a higher-level concept, and hence are columns in which the item 103 and the quantity 104 columns of the input table 101 are output as they are.

FIG. 4 is an explanatory diagram of a second specific example of the output table 009 stored in the data conversion system according to the first embodiment of this invention.

In FIG. 4, there is shown a specific example of an output table 301 to which a name input from the user is added to each column of the output table 201 shown in FIG. 3.

In this system, the article location ID 102 in the input table 101 is separated into a floor 302 representing a floor of the building in which the article is held, an area name 303 representing an area name, an aisle number 304 representing a shelf aisle number, a row number 305 representing a shelf row number, and a shelf number 306 representing a shelf level. Those numbers correspond to the article location ID (first to second digits) 202 to article location ID (tenth to eleventh digits) 206 of the output table 201 shown in FIG. 3, respectively.

Similarly, the responsible employee ID 105 in the input table 101 is separated into an entry year 309 representing the year the employee joined the company, an affiliated department ID 310 indicating the department with which the employee is affiliated, and an alphabetical-order number 311 representing the alphabetical order of employees who joined the company at the same time. Those numbers correspond to the responsible employee ID (first to fourth digits) 209 to responsible employee ID (seventh to eleventh digits) 211 of the output table 201 shown in FIG. 3, respectively.

In addition to adding names to columns including information to which a label can be assigned, for example, an ID, names like those described above are also added to columns representing the date and the time. The processing time 106 in the input table 101 is separated into a processing date 312 representing the processing date, a processing time (hour) 313 representing the processing time in one-hour units, and a processing time (minute) 314 representing the processing time in minutes. Those numbers correspond to the processing time (first to tenth digits) 212 to processing time (fifteenth to sixteenth digits) 214 of the output table 201 shown in FIG. 3, respectively.

When there is no higher-level-concept column, such as in the case of the "item" 307 and the "quantity" 308, the input column is output as it is. As described above, the data conversion system according to this embodiment automatically converts each column of the input table into a column having a higher-level concept, and outputs the converted columns.

Figure 5:
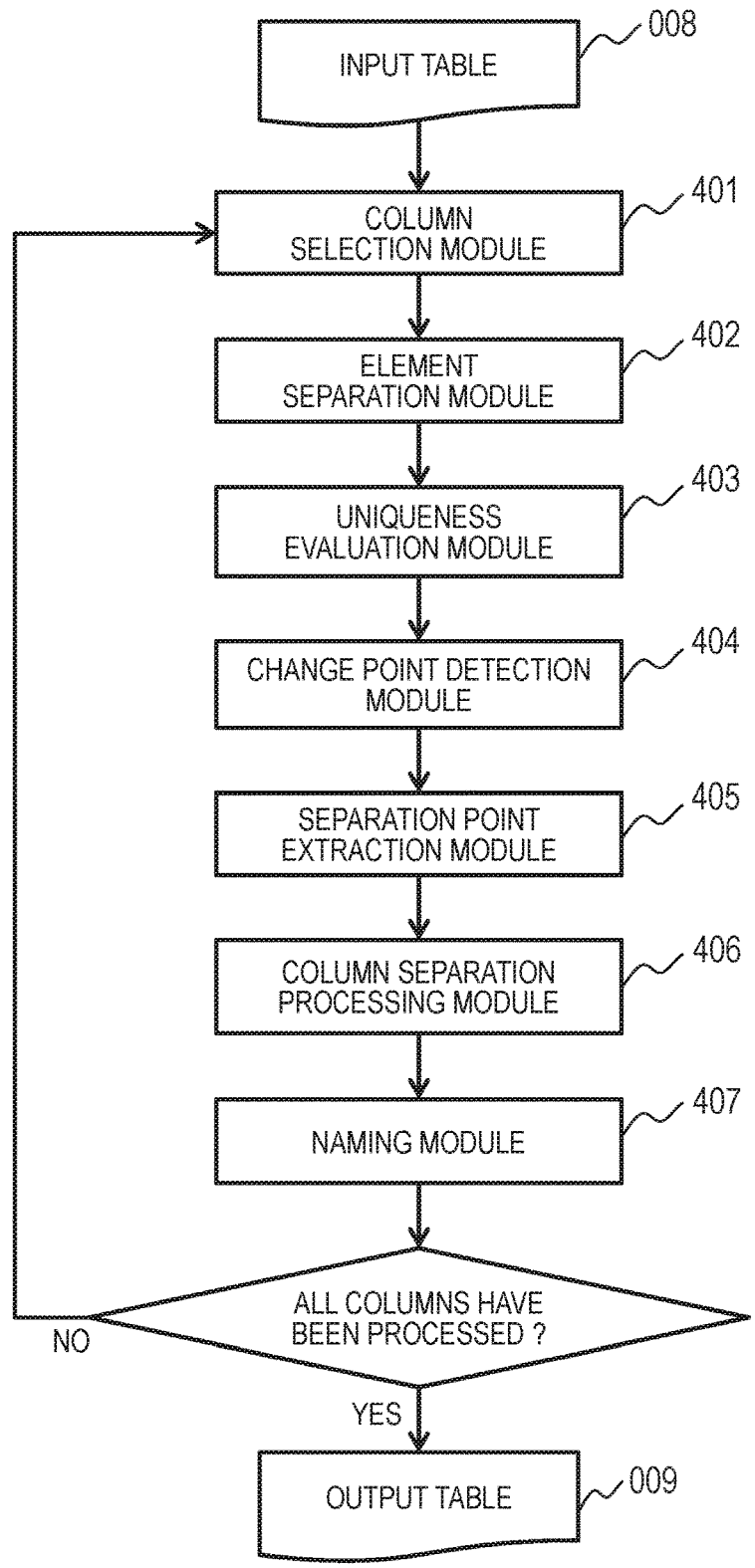
FIG. 5 is a flowchart for illustrating details of an abstraction processing module in the first embodiment of this invention.

FIG. 5 is a flowchart for illustrating details of the abstraction processing module 007 in the first embodiment of this invention.

The abstraction processing module 007 extracts and outputs the columns to be used as higher-level concepts of the original columns by separating the elements of each column of the input table. The abstraction processing module 007 includes a column selection module 401, an element separation module 402, a uniqueness evaluation module 403, a change point detection module 404, a separation point extraction module 405, a column separation processing module 406, and a naming module 407, which are each described later. Those modules are function blocks implemented by the central processing unit 001 executing a sub-program included in the program for implementing the abstraction processing module 007.

In the abstraction processing module 007, the column selection module 401 selects a column from the input table 008, and the element separation module 402 separates the elements included in the selected column into individual characters. The uniqueness evaluation module 403 calculates, for each element of each column separated into characters, a value representing the uniqueness of the data based on the number of unique elements. The change point detection module 404 extracts, as a change point(s), a character count at which the uniqueness value changes by using the evaluation value relating to the uniqueness calculated for each column. The separation point extraction module 405 extracts separation point(s) for separating a target column based on the extracted uniqueness change point(s). The column separation processing module 406 separates the target column into a plurality of columns in accordance with the extracted separation point(s) of the column. The naming module 407 sets a column name for each of a plurality of newly generated columns separated from the target column. When processing is completed for all the columns of the input table 008, an output table 009 including higher-level-concept columns obtained by abstracting each of the columns is output.

Figure 6:
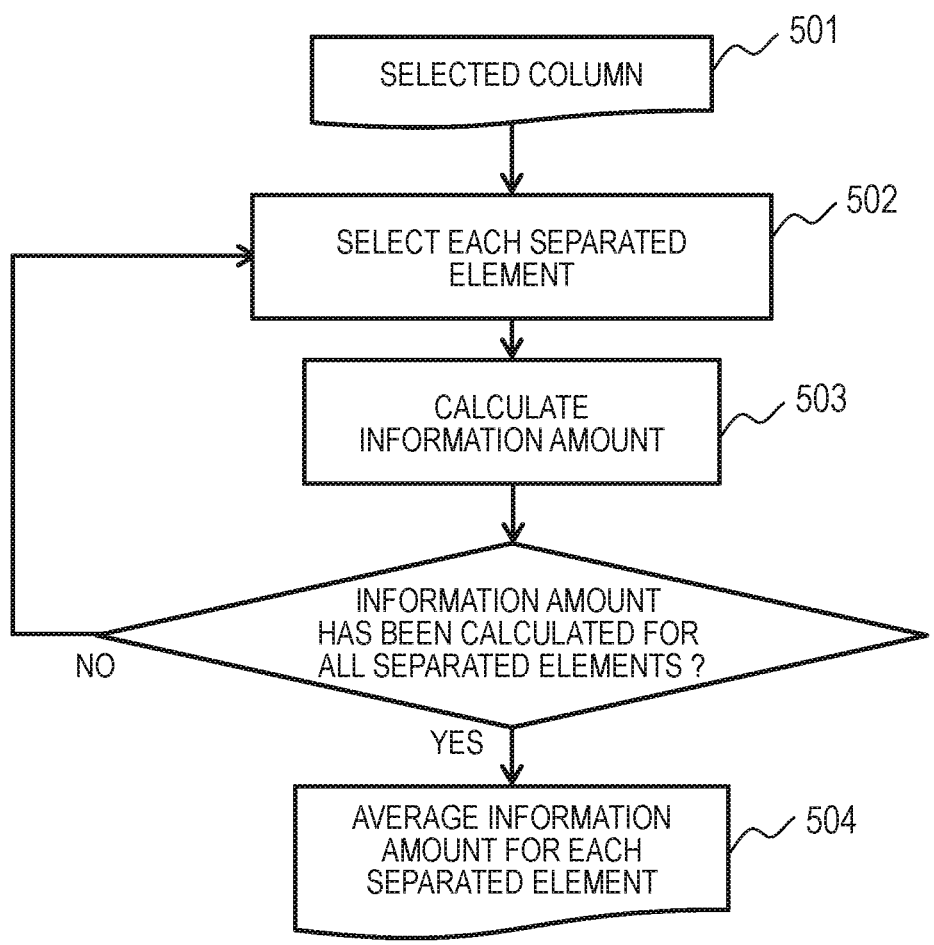
FIG. 6 is a flowchart for illustrating details of a uniqueness evaluation module in the first embodiment of this invention.

FIG. 6 is a flowchart for illustrating details of the uniqueness evaluation module 403 in the first embodiment of this invention.

The uniqueness evaluation module 403 calculates, by using a selected column 501 as an input, a value representing the uniqueness of the column. Specifically, the uniqueness evaluation module 403 sequentially selects each element separated from the selected column 501 (Step 502), and for each selected element, calculates a value for evaluating uniqueness (Step 503). In FIG. 6, as an example, the information amount of each element is calculated. Various other values, for example, the number of unique elements itself, may also be used as the value for evaluating uniqueness. The value for evaluating uniqueness, such as the number of unique elements, can be said to be a value representing the information amount of each element. In other words, in a broad sense, the uniqueness evaluation module 403 can be referred to as an information amount evaluation module. The uniqueness evaluation module 403 calculates values for all the separated elements, and then calculates an average information amount for each separated element. As a result, an average information amount 504 for each separated element is output.

Figure 7:
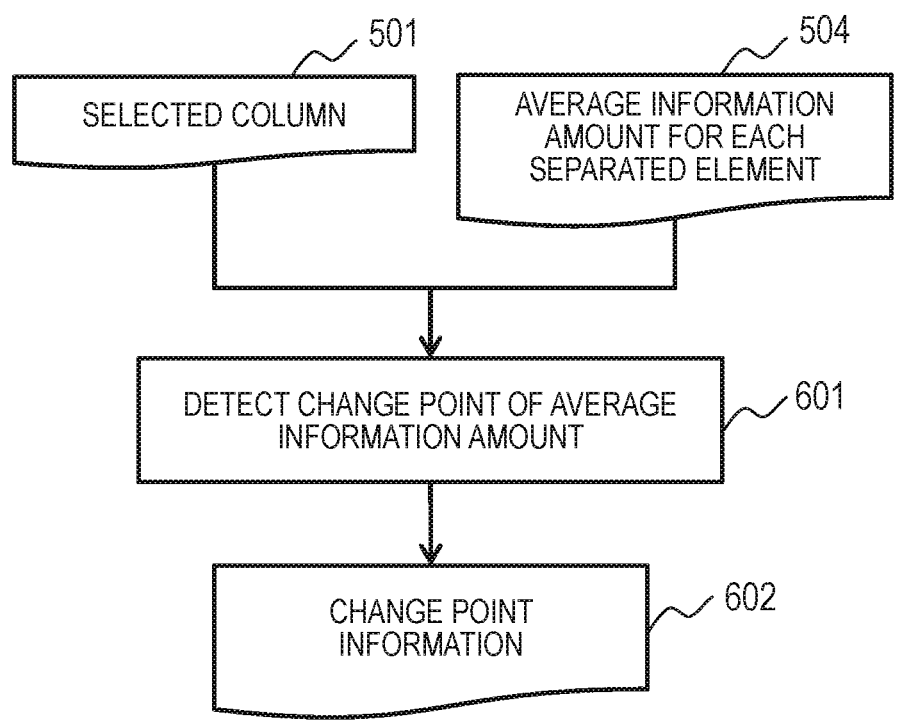
FIG. 7 is a flowchart for illustrating details of a change point detection module in the first embodiment of this invention.

FIG. 7 is a flowchart for illustrating details of the change point detection module 404 in the first embodiment of this invention.

The change point detection module 404 detects, by using the selected column 501 and the average information amount 504 for each separated element as inputs, a change point(s) in the values representing the uniqueness of the column. In the example of FIG. 7, the change point detection module 404 extracts the character count that is a change point at which the uniqueness value changes as the change point of the average information amount (Step 601). As the change point of the uniqueness value, an amount of change in the information amount when the character count of the elements in the column changes may be calculated, an amount of change in that change amount may be calculated, or other various change amounts may be calculated. As a result of this processing, the change point detection module 404 outputs detected change point information 602.

Figure 8:
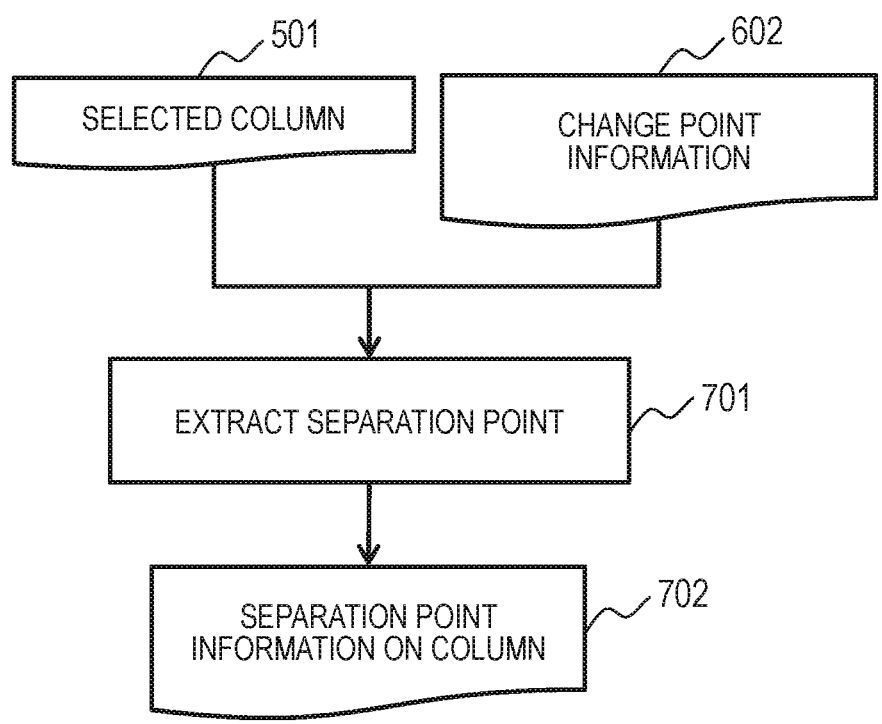
FIG. 8 is a flowchart for illustrating details of a separation point extraction module in the first embodiment of this invention.

FIG. 8 is a flowchart for illustrating details of the separation point extraction module 405 in the first embodiment of this invention.

The separation point extraction module 405 extracts, by using the selected column 501 and the extracted change point information 602 as inputs, a separation point(s) for separating the column based on the information on the uniqueness of the column. Specifically, the separation point extraction module 405 extracts, based on the change point(s) of the uniqueness of the elements in the column, a point(s) for separating the column into a plurality of columns having different concepts (Step 701). As a result of this processing, separation point information 702 on the column is output.

Figure 9:
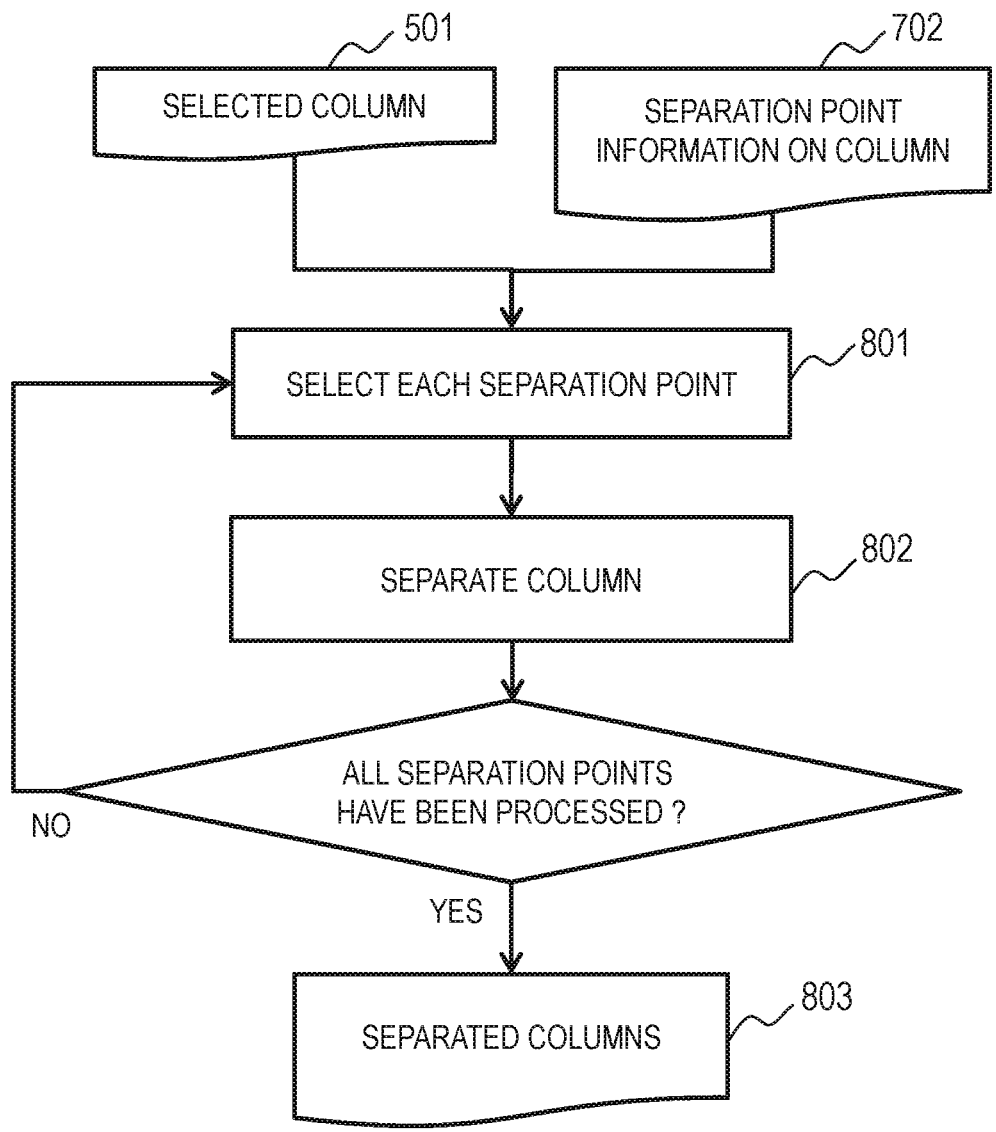
FIG. 9 is a flowchart for illustrating details of a column separation processing module in the first embodiment of this invention.

FIG. 9 is a flowchart for illustrating details of the column separation processing module 406 in the first embodiment of this invention.

The column separation processing module 406 separates, by using the selected column 501 and the column separation point information 702 as inputs, the column into a plurality of higher-level-concept columns. Specifically, the column separation processing module 406 selects, based on the column separation point information 702, each separation point by extracting the character counts at which separation is to occur (Step 801). Next, the column separation processing module 406 separates the selected column 501 into columns based on the extracted character counts (Step 802). The columns separated at all the separation points are output as separated columns 803.

Figure 10:
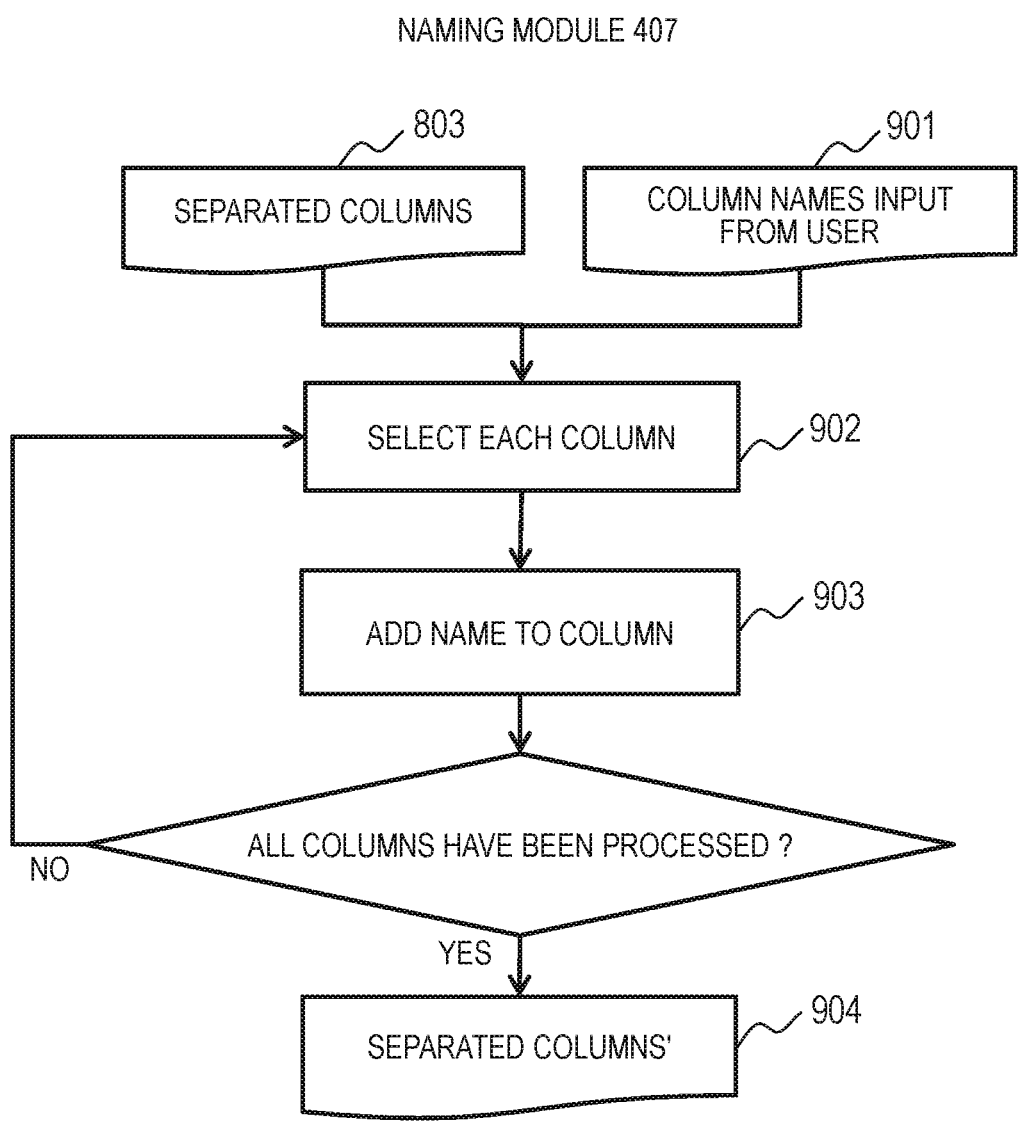
FIG. 10 is a flowchart for illustrating details of a naming module in the first embodiment of this invention.

FIG. 10 is a flowchart for illustrating details of the naming module 407 in the first embodiment of this invention.

The naming module 407 adds, by using the separated columns 803 and column names 901 input from the user as inputs, a name to each of the separated columns. Specifically, the naming module 407 selects each separated column (Step 902), and adds a name to each selected column by using information on the column name 901 input from the user (Step 903). Input of the column names 901 from the user is optional. When column names are not input, the naming module 407 adds, to each separated column, a name obtained by adding an identification symbol to the name of the separation source column. For example, when two columns have been generated from the "responsible employee ID" column, names such as "responsible employee ID (first to fourth digits)" and "responsible employee ID (fifth to sixth digits)" are automatically added. The naming module 407 adds a name to all the columns, and then outputs each separated column' 904.

Next, as a specific example of the processing illustrated in FIG. 5 to FIG. 10, description is made of the processing executed when the input table 008 shown in FIG. 2 is input with reference to FIG. 11 to FIG. 14.

Figure 11:
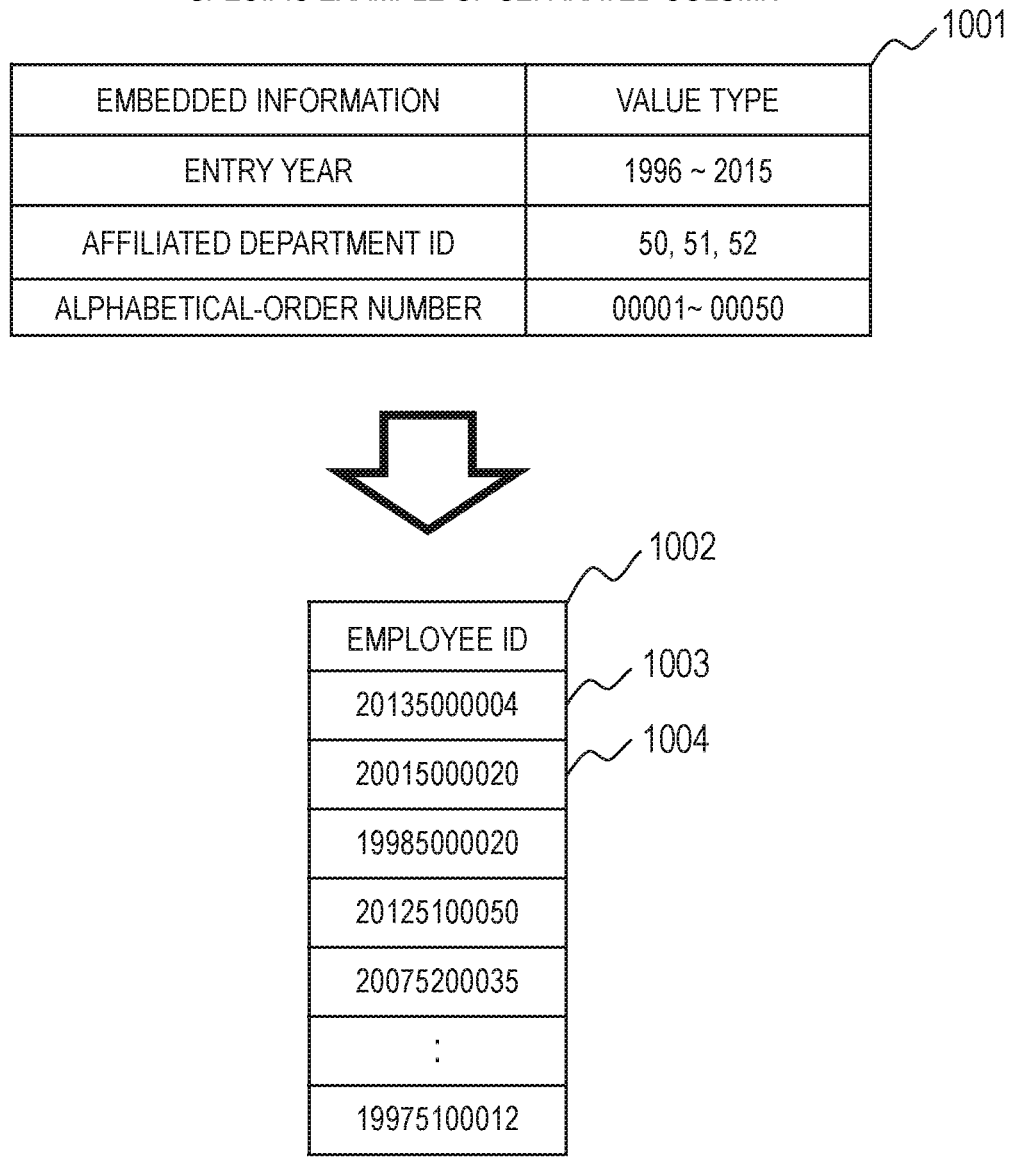
FIG. 11 is an explanatory diagram of a specific example of one column included in the input table 008 input to the abstraction processing module 007 in the first embodiment of this invention.

FIG. 11 is an explanatory diagram of a specific example of one column included in the input table 008 input to the abstraction processing module 007 in the first embodiment of this invention.

An employee ID column 1002 of FIG. 11 corresponds to the responsible employee ID 105 included in the table 101 of FIG. 2. As shown in a table 1001, each employee ID stored in the employee ID column 1002 is individually assigned to each employee. The assigned employee ID includes an "entry year" representing as a numerical value of the year the employee joined the company, an "affiliated department ID" representing as a symbol of a numerical value for the department with which the employee is affiliated, and an "alphabetical-order number" representing the alphabetical order of the names of employees who joined the company at the same time. The employee ID column 1002 shown in this specific example is a column in which each element is a numerical value, and the numerical value representing each element is treated in the same manner as a character string. In other words, it does not make sense to obtain a value of "40150000024" by adding, for example, the employee ID "20135000004" of a field 1003 and the employee ID "20015000020" of a field 1004. In this way, the value of each employee ID represented by "20135000004" is a label (name) attached to each real object or event. In this specific example, a label value in which a numerical value is regarded as a symbol is used, but a label including a symbol other than a numerical value, for example "A_23TT 0-a" or "Japan", or a name simply representing a target, may also be handled in the same manner.

When a table including a column like the employee ID 1002 is input to the abstraction processing module 007, each element included in the column is broken down into individual characters by the element separation module 402.

In FIG. 11, there is shown an example in which the column of the responsible employee ID 105 is selected from the input table 101 of FIG. 2. However, this embodiment can also be applied to a table constructed from only one column. Further, this embodiment can also be applied to structured data in any format including information corresponding to columns including a plurality of data elements as described above, even in formats other than a table format.

Figure 12:
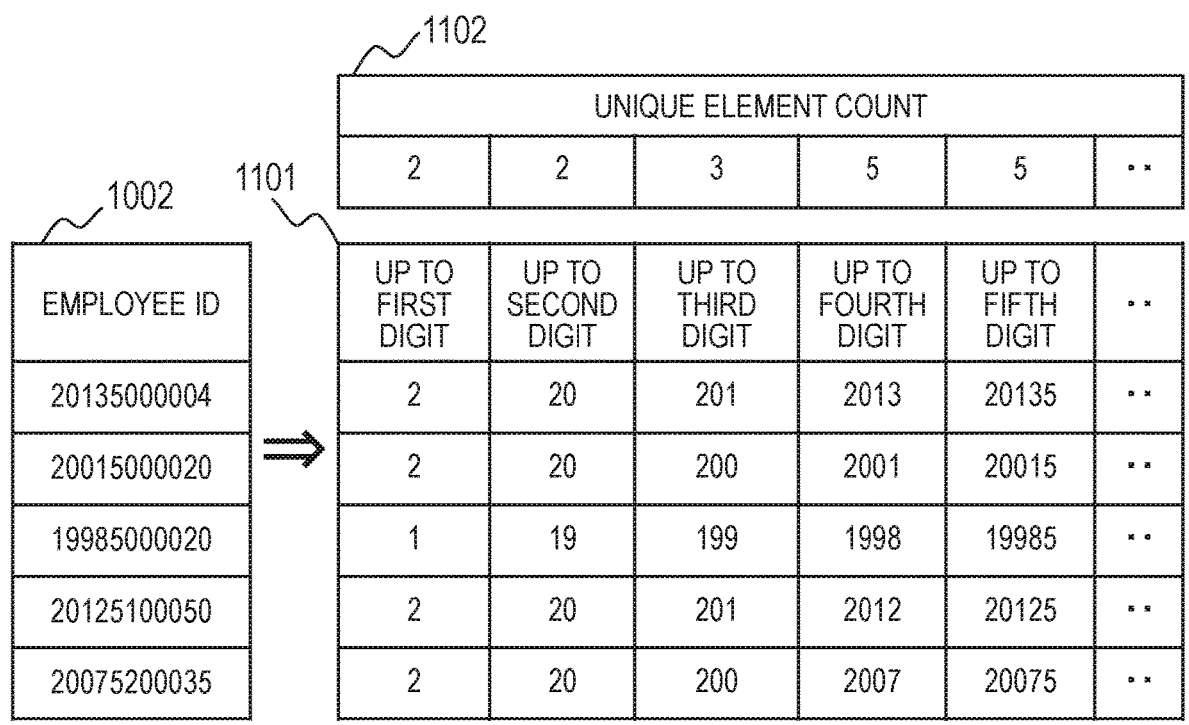
FIG. 12 is an explanatory diagram of a specific example of the uniqueness evaluation module 403 in the first embodiment of this invention.

FIG. 12 is an explanatory diagram of a specific example of the uniqueness evaluation module 403 in the first embodiment of this invention.

A separated column 1101 of FIG. 12 is a specific example for showing a part of the state in which the elements in the employee ID column 1002 of FIG. 11 are separated into each character count. As shown in FIG. 12, for example, when the employee ID column 1002 includes values such as "20135000004", "20015000020", "19985000020", "20125100050", and "20075200035", the elements in the employee ID column 1002 are separated by the element separation module 402 into a plurality of columns, such as a column consisting only of the numeral "2" or "1" from the first digit of each element, a column consisting only of the numerals "20" or "19" from the first and second digits of each element, or a column consisting only of the numerals "201", "200", or "199" from the first to third digits of each element. An index for evaluating uniqueness of the plurality of separated columns is calculated by the uniqueness evaluation module 403.

The processing for separating the column into a range of a predetermined number of digits as described above is merely one example of the processing for specifying the range for which an information amount is to be subsequently calculated by the uniqueness evaluation module 403. In actual practice, the element separation module 402 can specify the range as described above by a method other than separating the columns. The element separation module 402 can also be referred to as a range specification module.

A specific example of the index for evaluating uniqueness is the average information amount of the column. The average information amount is calculated, for example, by Expression (1).

$$H(X) = -\int_X p(x) \log p(x) dx \quad (1)$$

In Expression (1), x represents each element in the target column, and p(x) represents the rate (probability) at which the element x appears in the column. As the method of obtaining the value representing the uniqueness of a column, various methods, for example, simply determining the number of unique elements, may be used. When the number of unique elements is simply determined for each column 1101 obtained by separating the employee ID 1002 of FIG. 12, the column "up to first digit" has two unique elements, namely, "2" and "1", and hence has a unique count of two. The column "up to second digit" has two unique elements, namely, "20" and "19", and hence has a unique count of two. The column "up to third digit" has three unique elements, namely, "201", "200", and "199", and hence has a unique count of three. As described above, the result of calculating the unique count of each separated column is shown in a unique element count 1102.

The change point detection module 404 detects, among the values representing the uniqueness calculated for each column, a change point in the uniqueness in accordance with a change in the character count.

Figure 13:
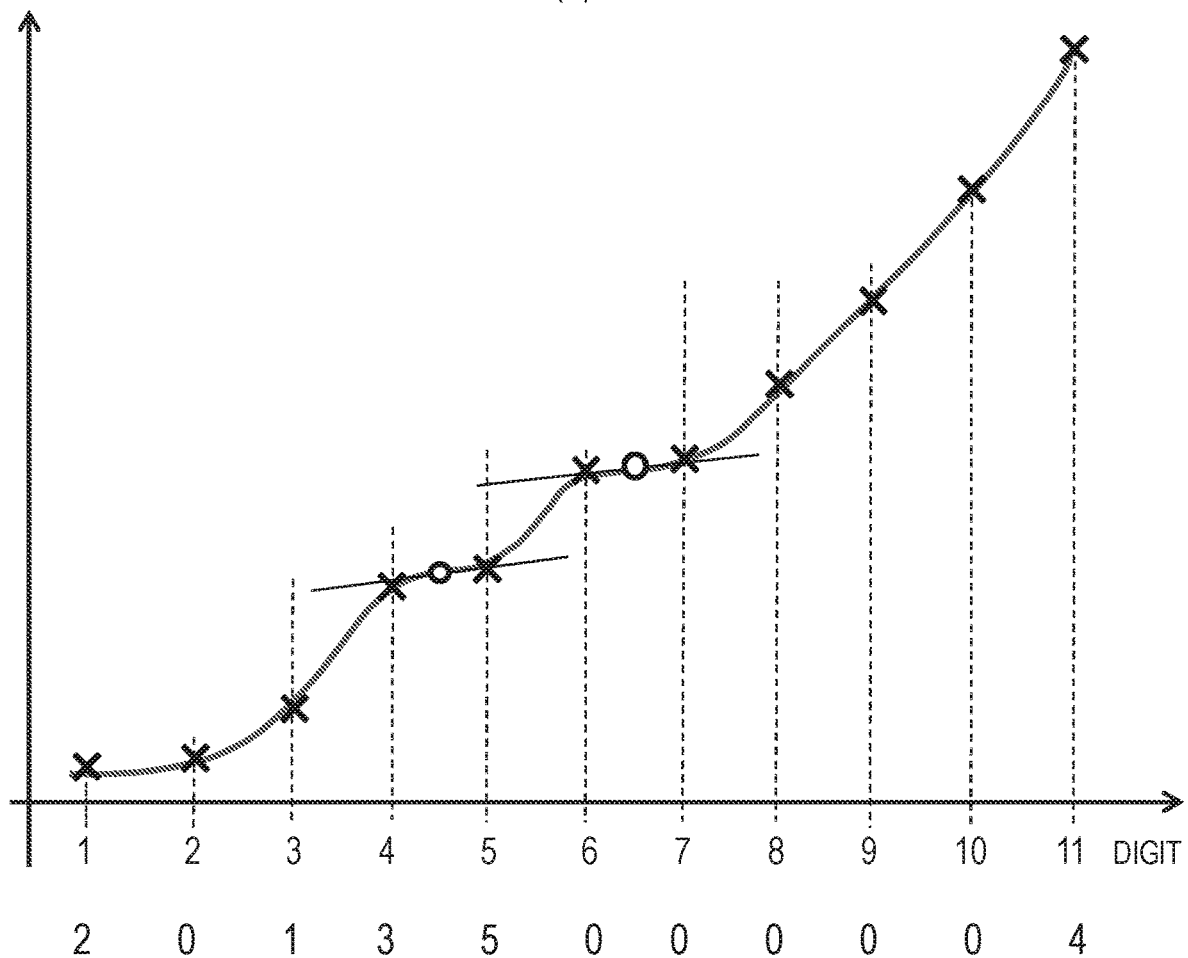
FIG. 13 is an explanatory diagram of a specific example of the change point detection module 404 in the first embodiment of this invention.

FIG. 13 is an explanatory diagram of a specific example of the change point detection module 404 in the first embodiment of this invention.

As a specific example, FIG. 13 is a graph for showing changes in the value (in this example, the average information amount) representing uniqueness. In FIG. 13, the horizontal axis represents the number of digits (character count) divided into ranges in order to separate the employee ID 1002 as shown in FIG. 12, and the vertical axis represents an average information amount H(X) of each separated column.

In the graph of FIG. 13, for each element of the employee ID column 1002, there is plotted the average information amount for ranges separated into, in order from the left side, the column of the first digit only, the columns up to the second digit, the columns up to the third digit, and so forth. It can be seen from the specific example that, for the elements representing the employee ID, the amount of change in the value of the average information amount changes in the vicinity of the fourth digit and the sixth digit. As described above, when the character count of the elements in the column to be separated has changed relative to the value representing the uniqueness of the column, the change point detection module 404 detects the point at which the change in uniqueness has a predetermined characteristic (i.e., satisfies a predetermined condition). Examples of the characteristic relating to the change in uniqueness may include various characteristics, such as a change in the value of the uniqueness itself, a change in the amount of change in the value of the uniqueness, and a point at which a change gradient becomes a maximum or 0. The separation point extraction module 405 extracts the separation point of the column by using this characteristic relating to the amount of change in uniqueness.

For example, as in the example described above, when an 11-digit employee ID includes a plurality of portions, such as the first four digits representing the entry year of the employee, the next two digits representing the department with which the employee is affiliated, and the last five digits representing the alphabetical order of the name of the employee, the average information amount of the separated column including a plurality of portions from the first digit to the sixth digit, for example, is generally substantially larger than the average information amount of a separated column including only one portion from the first digit to the fourth digit, for example. Therefore, the average information amount tends to increase as the number of portions included in the separated column increases, as shown in FIG. 13, and hence the position of the boundaries of the portions forming the column can be estimated based on the change in the average information amount exhibited when the number of digits included in the separated column is sequentially increased.

When the data elements in the column are separated by a specified length starting from the topmost digit in accordance with this estimation, and the information amount (e.g., average information amount or unique element count) is calculated while sequentially extending the length, the information amount may abruptly increase when an adjacent portion is newly included in the separated range. Therefore, for example, when the change in the information amount shows a local maximum value, the separation point may be extracted so as to separate a range having the length immediately before that change.

However, the information amount may differ depending on the digit even among each portion, such as in the case of the entry year of the employee and the alphabetical order of the name of the employee. For example, as shown in FIG. 11, when the entry year is from 1996 to 2015, the value of the last digit can be any one of ten numerals of from 0 to 9, but there are only three numerals the value of the next digit can take, namely, 9, 0, or 1, there are only two numerals the value of the digit after that digit can take, namely, 9 or 0, and there are only two numerals the value of the digit after that digit can take, namely, 1 or 2.

Therefore, when the information amount is calculated while extending the length of the range to be separated as described above, there can be observed a change in which the information amount increases each time a lower digit is sequentially added to that range, and abruptly increases in particular when the lowest digit is added, but when the topmost digit of the adjacent portion is added, the information amount hardly changes, and again gradually increases as lower digits are sequentially added. For that reason, for example, as shown in FIG. 13, the separation point may be extracted such that, when the change in the information amount shows a local minimum value, a range having the length immediately before the change is extracted, or when the change in the information amount shows a local maximum value, a range having the length immediately after the change is extracted.

In place of the above-mentioned local maximum value or local minimum value, a maximum value or a minimum value may be used. In another case, based on a reference point at which the amount of change in the information amount is larger than a predetermined value, or smaller than a predetermined value, a range having the length immediately before or immediately after that point may be separated. Higher-level-concept data can be extracted as appropriate by selecting the optimum reference point in accordance with the nature of the data to be extracted. Those methods are examples of a method of extracting a column separation point based on a point at which a change in the information amount of the data elements in accordance with a change in a specified range satisfies a predetermined condition, but any method can be employed as long as the employed method is applicable to those methods.

The column separation processing module 406 separates the column based on the separation point(s) extracted as described above.

FIG. 14 is an explanatory diagram of a specific example of the column separation processing module 406 in the first embodiment of this invention.

In FIG. 14, there is shown, as a specific example, a separation column obtained when the employee ID 1002 is separated. In FIG. 14, each of the elements of the employee ID 1002 is separated at the fourth digit and the sixth digit. As a result, the employee ID 1002 is separated into three columns, namely, an employee ID (first to fourth digits) 1201, an employee ID (fifth to sixth digits) 1202, and an employee ID (seventh to eleventh digits) 1203. As shown in the table 1001 of FIG. 11, those columns can be separated into a column meaning the entry year, a column meaning the affiliated department ID, and a column meaning the alphabetical order. In this way, a column formed from a plurality of portions each having a different meaning can be automatically separated into the respective portions.

When there has been an input relating to the column name from the user, a column name, such as an entry year 1204, an office ID 1205, and an alphabetical-order number 1206, is added to each of the separated columns. However, the naming module 407 may be omitted, and the above-mentioned employee ID (first to fourth digits) 1201 to employee ID (seventh to eleventh digits) 1203 may be output as they are.

The naming module 407 may also add an estimated name to each of the separated columns based on other information in place of using inputs from the user. For example, when the employee ID column 1002 has been extracted from the database 021, and when a definition file associating the elements included in the employee ID and the meaning of those elements (e.g., fifth to sixth digits and office with which the employee is affiliated) are included in the database 021, the naming module 407 may add the names to the separated columns by referring to that information.

When information associating the employee IDs and an attribute of each employee is included in the database 021, the naming module 407 may also calculate, based on that information, a similarity between each of the separated columns and an attribute of each of those separated columns based on information on each of the separated columns and the attributes thereof, and when the similarity satisfies a predetermined condition (e.g., larger than a predetermined value), add the attribute as the name of the separated column. For example, when information associating the employee IDs and the name of the office with which each employee is affiliated is included in the database 021, and when it is determined based on that information that there is a high similarity between the fifth to sixth digits of an employee ID and an affiliated office name, the naming module 407 may add a name (e.g., "office ID") generated based on the "affiliated office" to the separated fifth to sixth digit column. As a result, naming can be automated. The information in the database 021 that is required in order to perform such processing can be copied as required to the main storage apparatus 003 or the second storage apparatus 002, and referred to by the naming module 407.

Therefore, in this embodiment, input of the input table 008 to the abstraction processing module 007 enables a plurality of higher-level-concept columns to be obtained as the output table 009. At this time, as described above, for label data like an ID or a name, higher-level-concept data is extracted by focusing on each digit (character), and hence this embodiment can be applied to both numerical data and label data formed from a character string.

In the above-mentioned example, description is made of processing for extracting higher-level-concept data from the data of the columns, but regardless of the hierarchical relation of the concepts, when a data element in one column includes include a plurality of portions that have different meanings, each of those portions can be automatically separated by the above-mentioned processing.

Second Embodiment

Next, a second embodiment of this invention is described. Except for the differences described below, the respective parts in the system according to the second embodiment have the same functions as those of the parts denoted by the same reference symbols in the first embodiment illustrated in FIG. 1 to FIG. 14, and hence description of those parts is omitted.

Figure 15:
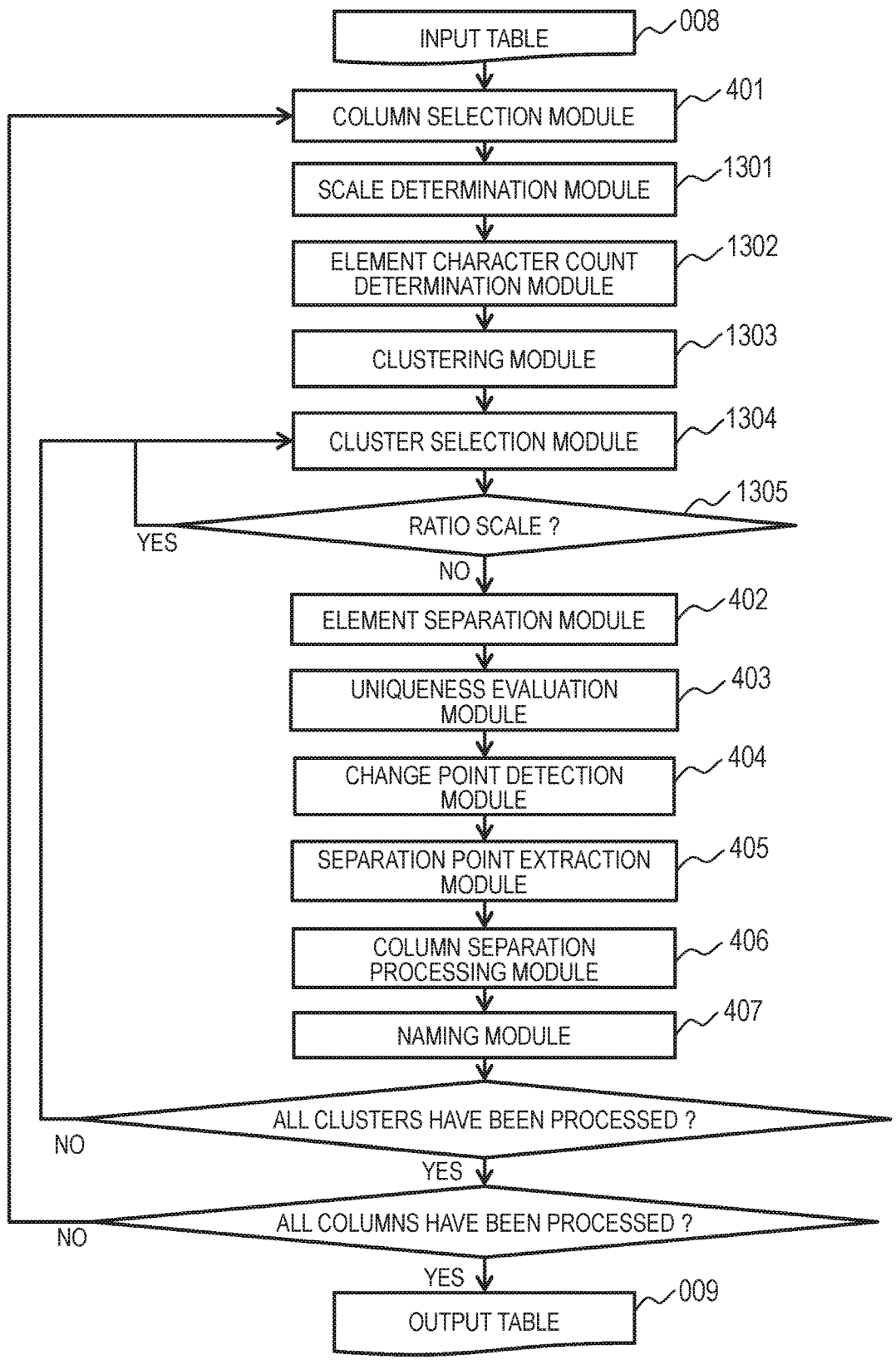
FIG. 15 is a flowchart for illustrating details of an abstraction processing module in a second embodiment of this invention.

FIG. 15 is a flowchart for illustrating details of the abstraction processing module 007 in the second embodiment of this invention.

The difference from the first embodiment is the inclusion of processing by a scale determination module 1301 to cluster selection module 1304 for determining the appropriateness of applying the abstraction processing to each column selected by the column selection module 401. The scale determination module 1301 to the cluster selection module 1304 are function blocks implemented by, similarly to the column selection module 401, the central processing unit 001 executing a sub-program included in the program for implementing the abstraction processing module 007.

The scale determination module 1301 determines a level of measurement of the elements in the column selected by the column selection module 401. The level of measurement is a scale for mathematically and statistically classifying collected data based on the nature of information represented by that data. There are generally four levels in the scale, namely, ratio scale, interval scale, ordinal scale, and nominal scale.

A nominal scale is used on data for which only matches among the data can be compared. In a nominal scale, a number or a symbol is allocated to a target as a simple name. As a specific example, a nominal scale can be applied to an employee ID 102 represented as "20135000004", or to an employee name (not shown) "Taro Tanaka", for example.

An ordinal scale allows, in addition to matches among the data, a comparison of the order. For example, an ordinal scale can be applied to "2" and "4" in a marathon rank column (not shown).

An interval scale is a scale that allows, in addition to a comparison of matches and order among the data, an addition/subtraction operation to be applied. For example, an interval scale can be applied to the "2016/01/07 09:12" and "2016/01/08 12:50" in the processing time 106 column.

A ratio scale is a scale that allows, in addition to a comparison of matches and order among the data, and an addition/subtraction operation, a ratio to be obtained. For example, an interval scale can be applied to "27" and "54" in an age column (not shown).

As described with reference to the specific example of FIG. 11, the symbols representing the data may be classified based on the nominal scale even in the case where symbols are numerical values, and hence it is required to determine the type of scale in order to acquire scale information.

The data that is mainly discussed in this invention is a nominal scale column like the employee ID 1002 described with reference to FIG. 11, but this invention is also applicable to a time column like the processing time 106 column described with reference to the input table of FIG. 2. The dates and times like in the processing time 106 are classified on an interval scale.

The element character count determination module 1302 calculates a character count of each element for the elements in the selected column, and determines whether or not the character counts are the same. The clustering module 1303 classifies the elements into clusters for each determined element character count. The cluster selection module 1304 selects each of the clusters that have been clustered for each element character count. The abstraction processing module 007 determines, by using the scale information determined by the scale determination module 1301, whether or not the selected column is a ratio scale (Step 1305), and when the selected column is a scale other than a ratio scale, applies the above-mentioned abstraction processing (i.e., processing by the element separation module 402 to naming module 407).

When the elements of the target column are classified into different clusters because many of the elements have different character counts, the element character count determination module 1302 and the clustering module 1303 may also separate the elements in the column by using a regular expression in place of applying the processing of the abstraction processing module 007. In this case, the element character count determination module 1302, for example, determines a regular expression for expressing each element in the target column, and separates the portions in which the regular expression dynamically changes.

The above-mentioned method is one example of a method of clustering elements based on an inter-element distance, but various other distances may be used as the inter-element distance. For example, the above-mentioned difference in character count is one example of the inter-element distance, but other examples of the distance may include an inter-element Euclidean distance and a Levenshtein distance.

The column to which the abstraction processing is to be applied can be determined by the scale determination module 1301, the element character count determination module 1302, and the clustering module 1303.

Figure 16:
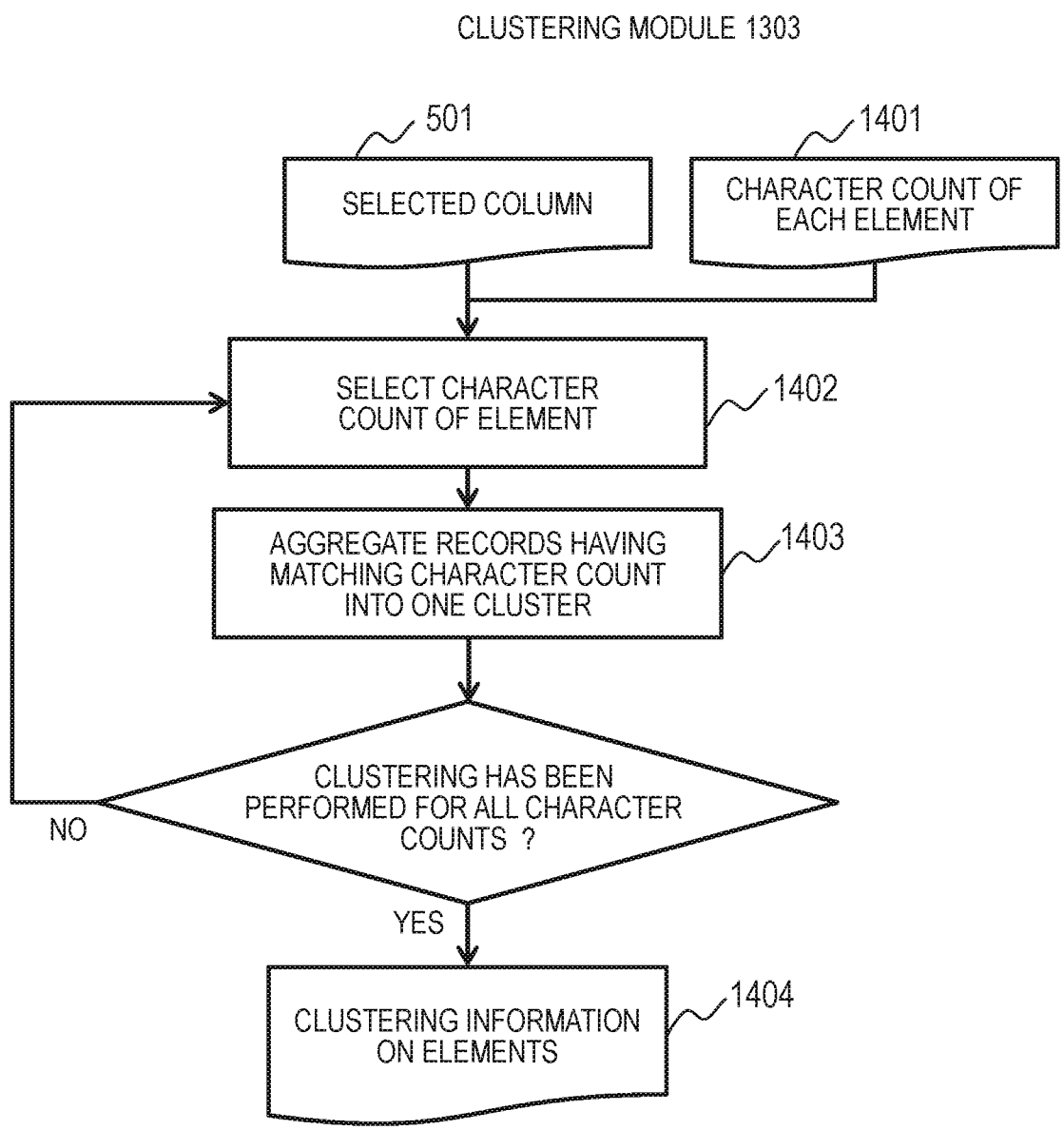
FIG. 16 is a flowchart for illustrating details of a clustering module in the second embodiment of this invention.

FIG. 16 is a flowchart for illustrating details of the clustering module 1303 in the second embodiment of this invention.

The clustering module 1303 selects the character count of each element of the selected column 501 in order from a character count 1401 of each element (Step 1402). Next, the clustering module 1303 aggregates records having a matching character count into one cluster by clustering elements having the relevant character count into the same cluster (Step 1403). After the processing for all the character counts is complete, the clustering module 1303 outputs clustering information 1404 on the elements.

According to the above-mentioned second embodiment, even for a table including data having various scales, a column capable of being subjected to abstraction processing can be automatically determined, and abstraction processing can be performed on that column. Further, even when different elements are included in one column, execution of clustering enables abstraction processing to be performed on each cluster.

This invention is not limited to the embodiments described above, and encompasses various modification examples. For example, the embodiments have described this invention in detail for the ease of understanding, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

Further, a part or all of the above-mentioned respective configurations, functions, processing modules, processing means, and the like may be implemented by hardware through design using, for example, an integrated circuit. Further, the above-mentioned respective configurations, functions, and the like may be implemented by software by the processor interpreting and executing the programs for implementing the respective functions. The programs, the tables, the files, and other such information for implementing the respective functions may be stored in a storage device, for example, a non-volatile semiconductor memory, a hard disk drive, or a solid state drive (SSD), or a non-transitory computer-readable data storage medium, for example, an IC card, an SD card, or a DVD.

Further, the illustrated control lines and information lines are assumed to be required for the sake of description, and not all the control lines and information lines of a product are illustrated. It should be understood that almost all the configurations are coupled to one another in practical use.

What is claimed is:

1. A data conversion system, comprising:
    a storage unit configured to store a column comprising a plurality of data elements;
    a range specification module configured to specify a range of each of the plurality of data elements in the column;
    an information amount evaluation module configured to calculate an information amount of each of the plurality of data elements having a specified range in the column; and
    a change point detection module configured to detect a point at which a change in the information amount in accordance with a change in the specified range satisfies a predetermined condition; and
    a separation point extraction module configured to extract, based on the point at which a change in the information amount satisfies the predetermined condition, a point at which each of the plurality of data elements is to be separated,
    wherein a separated column comprising the plurality of data elements separated at the point extracted by the separation point extraction module is output,
    wherein the range specification module is configured to specify a range having a specified length from a head of each of the plurality of data elements as the range of each of the plurality of data elements in the column,
    wherein the change point detection module is configured to detect a point at which a change in the information amount exhibited when the length of the specified range is changed satisfies the predetermined condition,
    wherein the change point detection module is configured to detect, as the point at which a change in the information amount satisfies the predetermined condition, a point at which a gradient of the information amount relative to the length of the specified range is any one of a local maximum and a local minimum, and
    wherein the separation point extraction module is configured to extract the point at which each of the plurality of data elements is to be separated such that each of the plurality of data elements is separated by the specified range of any one of immediately before and immediately after the change in the length of the specified range corresponding to the change in the information amount satisfying the predetermined condition.

2. The data conversion system according to claim 1,
    wherein the change point detection module is configured to detect, as the point at which a change in the information amount satisfies the predetermined condition, a point at which an amount of change in the information amount relative to the length of the specified range is larger than a predetermined value or smaller than the predetermined value, and
    wherein the separation point extraction module is configured to extract the point at which each of the plurality of data elements is to be separated such that each of the plurality of data elements is separated by the specified range of any one of immediately before and immediately after the change in the length of the specified range corresponding to the change in the information amount satisfying the predetermined condition.

3. The data conversion system according to claim 1, further comprising a naming module configured to generate information representing a name of the separated column to store the generated information in the storage unit, wherein the naming module is configured to:
store, when a name of the separated column has been input, information on the input name in the storage unit; and
store, when another column associated with the column is stored in the storage unit, and a similarity between a plurality of data elements in the separated column and a plurality of data elements in the another column satisfies a predetermined condition, a name generated based on a name of the another column in the storage unit as the name of the separated column.

4. The data conversion system according to claim 1,
wherein the storage unit is configured to store a table having a relational database format,
wherein the data conversion system further comprises a column selection module configured to select any one column in the table having a relational database format, and
wherein the range specification module is configured to specify a range of each of the plurality of data elements in the column selected by the column selection module.

5. The data conversion system according to claim 1, wherein the information amount evaluation module is configured to calculate any one of an average information amount and a unique element count as the information amount of each of the plurality of data elements having the specified range.

6. The data conversion system according to claim 1, further comprising a scale determination module configured to determine a scale of a data element to be included in the column,
wherein processing by the range specification module, the information amount evaluation module, and the change point detection module is executed when the determined scale satisfies a predetermined condition.

7. The data conversion system according to claim 6, wherein the processing by the range specification module, the information amount evaluation module, and the change point detection module is inhibited from being executed when the determined scale is a ratio scale.

8. The data conversion system according to claim 1, further comprising a clustering module configured to classify the plurality of data elements included in the column into a plurality of clusters based on an inter-element distance between the plurality of data elements,
wherein processing by the range specification module, the information amount evaluation module, and the change point detection module is executed on each of the plurality of clusters.

9. The data conversion system according to claim 8,
wherein the inter-element distance between the plurality of data elements comprises a difference in length between the plurality of data elements, and wherein the clustering module is configured to classify the plurality of data elements included in the column so that data elements having the same length are included in the same cluster.

10. A data conversion system, comprising:
a processor; and
a storage apparatus coupled to the processor,
the storage apparatus being configured to store a column comprising a plurality of data elements,
the processor being configured to:
specify a range of each of the plurality of data elements in the column;
calculate an information amount of each of the plurality of data elements having a specified range in the column; and
detect a point at which a change in the information amount in accordance with a change in the specified range satisfies a predetermined condition;
extract, based on the point at which a change in the information amount satisfies the predetermined condition, a point at which each of the plurality of data elements is to be separated, wherein a separated column comprising the plurality of data elements separated at the point extracted by the separation point extraction module is output;
generate information representing a name of the separated column to store the generated information in the storage unit;
store, when a name of the separated column has been input, information on the input name in the storage unit; and
store, when another column associated with the column is stored in the storage unit, and a similarity between a plurality of data elements in the separated column and a plurality of data elements in the another column satisfies a predetermined condition, a name generated based on a name of the another column in the storage unit as the name of the separated column.

11. A method of converting data, which is executed by a computer comprising a processor and a storage apparatus coupled to the processor,
the storage apparatus being configured to store a column comprising a plurality of data elements,
the method comprising:
specifying, by the processor, a range of each of the plurality of data elements in the column;
calculating, by the processor, an information amount of each of the plurality of data elements having a specified range in the column; and
detecting, by the processor, a point at which a change in the information amount in accordance with a change in the specified range satisfies a predetermined condition; and
determining a scale of a data element to be included in the column,
wherein the steps of specifying, calculating and detecting are executed when the determined scale satisfies a predetermined condition,
wherein the steps of specifying, calculating and detecting are inhibited from being executed when the determined scale is a ratio scale.

* * * * *